United States Patent [19]

Kraus

[11] Patent Number: 4,911,965

[45] Date of Patent: Mar. 27, 1990

[54] ASSEMBLY FOR PROTECTING DECORATIVE SURFACE

[75] Inventor: Frederick L. Kraus, Louisville, Ky.

[73] Assignee: General Electric Co., Louisville, Ky.

[21] Appl. No.: 354,735

[22] Filed: May 22, 1989

[51] Int. Cl.$^4$ .............................................. B32B 3/10
[52] U.S. Cl. ...................................... 428/43; 428/131
[58] Field of Search ........................... 428/43, 131, 119

[56] References Cited

U.S. PATENT DOCUMENTS

| | | | |
|---|---|---|---|
| 3,143,208 | 8/1964 | Sizemore, Jr. | 428/131 X |
| 3,655,424 | 4/1972 | Orowan | 428/164 |
| 3,704,194 | 11/1972 | Harrier | 428/131 X |
| 3,751,100 | 8/1973 | Keyes | 428/31 X |
| 3,752,304 | 8/1973 | Alef | 428/131 X |
| 3,794,554 | 2/1974 | Caring | 428/102 X |
| 3,916,838 | 11/1975 | Swart | 428/131 X |
| 4,079,550 | 3/1978 | Bursk et al. | 49/467 |
| 4,500,580 | 2/1985 | Luciani | 428/131 X |
| 4,532,162 | 7/1985 | Neece | 428/919 X |

Primary Examiner—Henry F. Epstein
Attorney, Agent, or Firm—Radford M. Reams; H. Neil Houser

[57] ABSTRACT

An assembly for protecting a decorative surface includes a support structure and a trim piece positioned over the support structure including an outer decorative surface. A protective sheet is removably adhered to the outer decorative surface. Screws extend through corresponding openings in the trim piece and protective sheet for securing the decorative sheet to the support structure. The protective sheet has a closed loop, weakened parting line surrounding and spaced outwardly from each of the screw receiving openings. The head of each screw includes an inner portion engaging the protective sheet and having a diameter substantially the same as the material enclosed in the parting line and a larger diameter outer portion extending radially beyond the inner portion and spaced from the protective sheet. When the protective sheet is peeled from the decorative surface of the trim piece the decorative sheet separates along the parting line without leaving protective sheet residue extending out from under the head of the screws.

5 Claims, 2 Drawing Sheets

ASSEMBLY FOR PROTECTING DECORATIVE SURFACE

BACKGROUND OF THE INVENTION

This invention is directed to an assembly for temporarily protecting decorative surfaces on various articles of manufacture such as, for example, household appliances. Many household appliances have various pieces of trim which, in addition to serving structural functions, often are used to enhance the appearance of the particular appliance. For example, the outer edge of the door of a built-in dishwasher often is enclosed by trim strips which have a shiny metallic appearance. They may be polished metal or may be some form of plastic with a metal coating. The control panel of dishwashers and backsplash or control panel of clothes washers also often have decorative trim strips, as do various portions of other products such as refrigerators and various cooking products.

Such decorative trim pieces are subject to being defaced during manufacture, shipping or installation. It is a current practice to provide the individual pieces of trim with protective sheets removably adhered to the decorative surface. These sheets are left on the trim pieces during the manufacturing and shipping processes and are removed when the appliance has been installed in the consumer's home. This protects the decorative surface from accidental marring. However, such decorative strips or trim pieces often are secured to the underlying structure by physical attaching devices such as screws, rivets or bolts that pass through the protective sheet as well as the underlying trim piece. When the protective sheet is pulled off the trim piece at the time of installation, it tears around the head of the screw or other attachment device and leaves remnants of the protective sheet adhering to the trim piece. It is a very painstaking and time consuming process to pick off such remnants. On the other hand, if the installer uses a knife or other sharp instrument to cut around the head of the screw, it is quite likely to mar the underlying decorative surface of the trim piece.

It is therefore an object of the present invention to provide an improved assembly for protecting a decorative surface of an article of manufacture.

It is further object of this invention to provide such an assembly with which the protective sheet can be removed quickly and easily and yet cleanly.

SUMMARY OF THE INVENTION

In accordance with one form of the present invention there is provided an assembly for temporarily protecting the outer surface of an article of manufacture including a support structure and an outer member overlying the support structuring including at least one opening therethrough. A protective sheet is removably adhered to the outer surface of the outer member and has at least one opening therethrough in alignment with at least one opening through the outer member. The protective sheet also has a closed loop, weakened parting line surrounding and spaced outwardly from each of the at least one opening through the protective sheet. At least one attachment means for securing the outer member to the support structure includes a shank, extending through each of the corresponding openings in the protective sheet and outer member, and a head overlying the protective sheet outwardly of the parting line so that, upon removal of the protective sheet from the outer member, the protective sheet will separate along the parting line without leaving protective sheet residue extending out from under the head of the attachment means.

DESCRIPTION OF THE PREFERRED EMBODIMENTS

Figure 1:
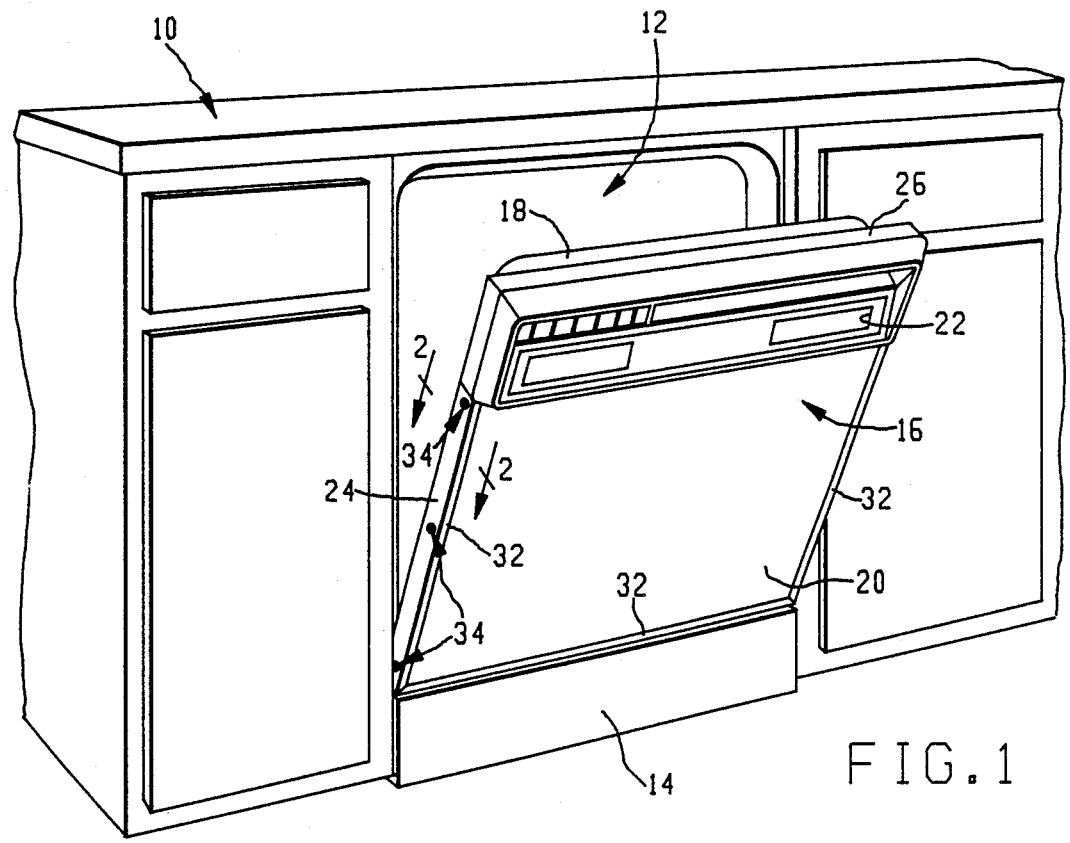
FIG. 1 is a schematic perspective view of a kitchen counter installation including an automatic dishwasher with the door of the dishwasher shown as partly opened and with internal operating components of the dishwasher omitted for the sake of simplicity.

FIG. 1 illustrates, in somewhat schematic form, a kitchen cabinet structure 10 with a built-in dishwasher 12 installed. The front of the dishwasher includes a lower stationery panel 14 and a door 16 which is pivotally mounted about its lower edge for selectively providing access to the interior of the dishwasher. The door 16 is shown in a partially opened configuration for purposes of illustration and the various operative components in the interior of the dishwasher have been omitted for the sake of simplicity. The door 16 includes an inner door 18, a decorative front panel 20, which conveniently may be made of a material to blend with the kitchen cabinets, and a control panel 22. The dishwasher 12 includes several trim pieces such as, for example, door edge member 24 and cap 26. Such trim members typically have a bright metal appearance. However, they may have other appearances which enhance the aesthetic appeal of the appliance.

Figure 2:
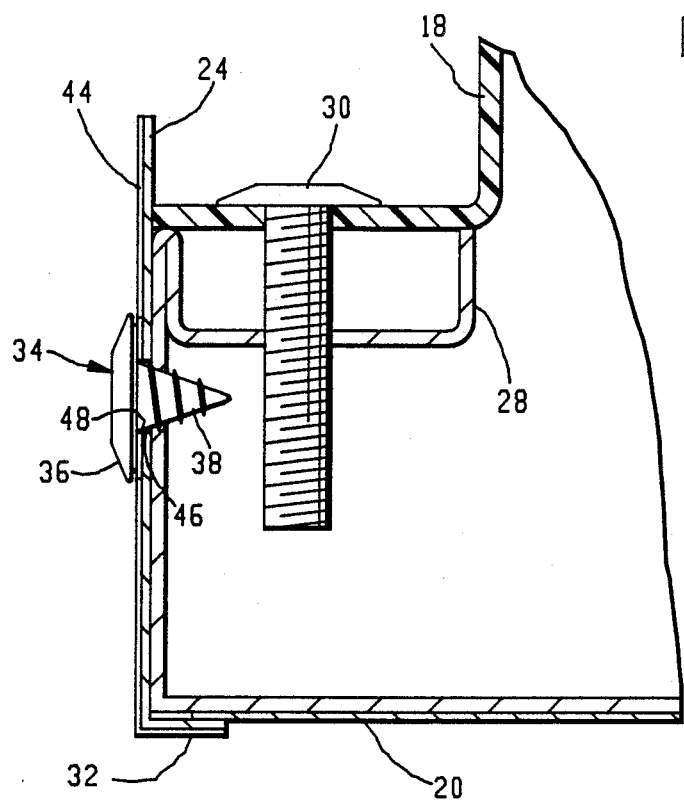
FIG. 2 is a enlarged cross sectional view taken along lines 2-2 of FIG. 1.
Figure 3:
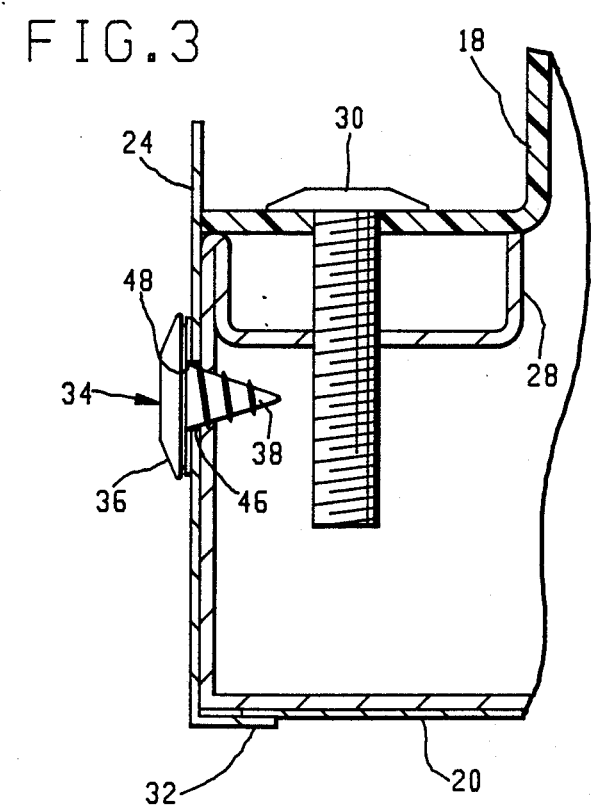
FIG. 3 is an enlarged cross sectional view similar to FIG. 2, but with the protective sheet removed from the assembly.

FIGS. 2 and 3 show certain details of construction of the door 16. The inner door panel 18 is connected to a support frame 28 by suitable means such as bolts 30. The front decorative panel 20 is secured to the front of the support frame by edge members 24 which have an L-shaped extension or foot 32 extending across the lateral edges of the door panel 20. In fact the edge members or trim pieces 24 confine three lateral edges of the front panel 20, that is, both side edges and the bottom. The top of the panel 20 is positioned behind the control panel 22 so that the entire lateral circumferential edge of the panel 20 is enclosed by other members of the door assembly.

Figure 4:
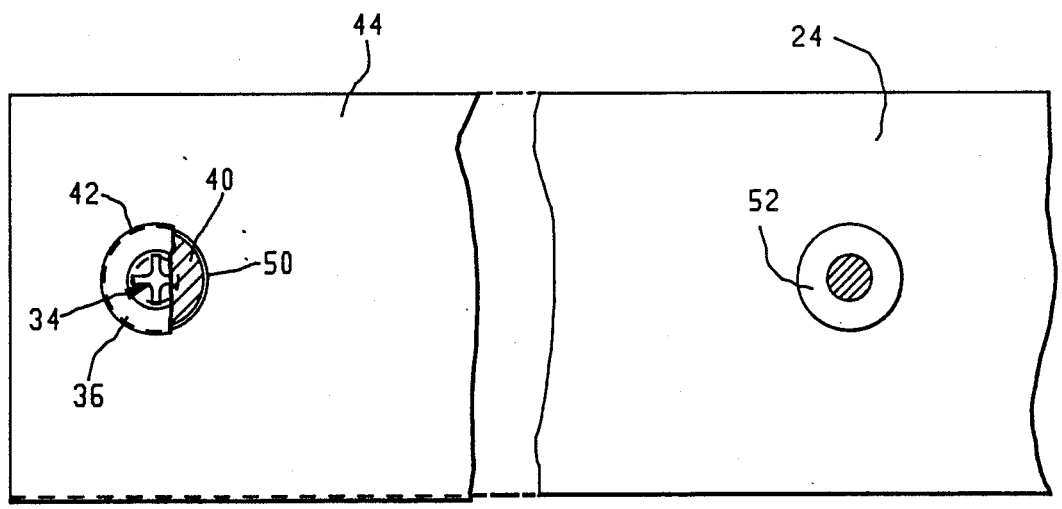
FIG. 4 is an enlarged plan view of the trim piece from the dishwasher of FIG. 1, with the decorative sheet in place on the left hand portion of FIG. 4 and with the decorative sheet and screwhead removed from the right hand portion for purposes of illustration.
Figure 5:
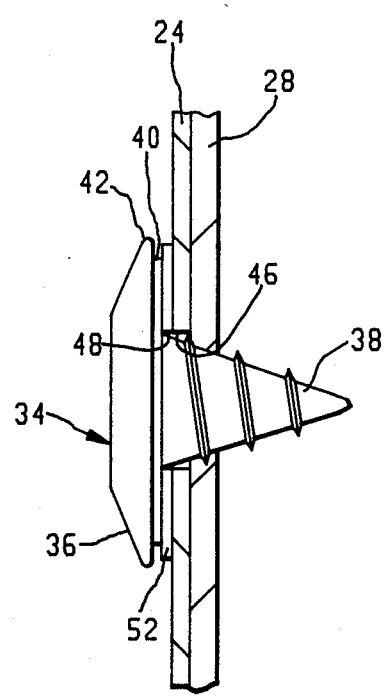
FIG. 5 is a cross sectional view of the assembly seen in FIG. 3, further enlarged to better illustrate the relationship of the screwhead and protective sheet.

The trim pieces or members 24 are secured to the support structure 28 by a number of screws 34, each of which has a head 36 and a threaded shank or shaft 38. As best seen in FIG. 5 the screwhead 36 includes an inner, smaller diameter, portion 40 and an outer, larger diameter, portion 42. The trim piece 24 initially is provided with a protective sheet 44 which is removably adhered to the outer decorative surface of the trim member 24. The trim member 24 and protective sheet 44 have corresponding openings 46 and 48 through which the shanks or shafts 38 of the screws 34 pass to secure the trim piece 24 to the support structure 28. In addition the protective sheet 44 includes closed loop, weakened parting lines 50 each of which surround and is spaced outwardly of a corresponding one of the openings 48 (best seen in FIG. 4). More specifically, each parting line 50 defines a portion of material which is of the same general size and shape as the inner portion 40 of the screwhead 36. Preferably the parting line is positioned so that, when the screw is inserted through the openings 46 and 48, the parting line 50 will lie just barely outside the circumferential edge of the inner, smaller diameter, screwhead portion 40.

The protective sheet 44 is left on the trim piece 24 during manufacture and during shipment. When the dishwasher is installed in a consumer's home, the installer peels the decorative strip from the outer, decorative surface of the trim piece 24. As the protective sheet 44 is peeled away it parts or separates at each of the parting lines 50 so as to leave a ring 52 of protective material between the inner portion 40 of each screwhead 36 and the mating portion of the trim piece 24. Since the parting lines 50 are formed as weakened areas of the protective sheet or strip 44 the parting of the sheet 44 is clean and no remnants of the protective sheet extend outwardly from under the screwhead 36. Since the outer, larger diameter portion 42 of each screwhead 36 is held away from the protective sheet 44 by the corresponding inner head portion 40, the protective sheet is not caught by the outer head portion as it is peeled away. This further assures that there is a clean area around the screwheads without remnants of protective sheeting and without the necessity of the installer painstakingly removing small bits of protective sheeting that were caught by the screwhead.

It will be understood that changes as to the precise arrangements, shapes, details and connections of the component parts may be made by those having ordinary skill in the art without departing from the spirit of the invention or the scope thereof as set out in the claims which follow.

What is claimed is:

1. A protected decorative surface assembly including:
a support structure;
a trim piece positioned over said support structure and including an outer decorative surface;
attachment means for securing said trim piece to said support structure, said attachment means including a shank extending through said trim piece and a head having a larger cross sectional area than said shank and overlying said decorative surface; and
a protective sheet removably adhered to said decorative surface and extending under said attachment means head, said protective sheet having a closed loop, weakened parting line positioned axially under and radially inward of the edge of said attachment means head;
so that, upon removal of said protective sheet from said decorative surface, said protective sheet will separate along said parting line and leave said decorative surface substantially free of protective sheet residue extending from under said attachment means.

2. An assembly as set forth in claim 1 wherein said attachment means head includes:
an inner portion engaging said protective sheet and corresponding in cross-section to the size and shape of the area defined by said parting line and an outer portion spaced from said protective sheet and extending radially beyond said parting line.

3. An assembly as set forth in claim 1 wherein said protective sheet is provided with an opening therethrough within the area defined by said parting line for passage therethrough of said attachment means shank.

4. An assembly for temporarily protecting the outer surface of an article of manufacture, including:
a support structure;
an outer member overlying said support structure and including at least one opening therethrough;
a protective sheet removably adhered to the outer surface of said outer member; said protective sheet having at least one opening therethrough in alignment with said at least one opening through said outer member; said protective sheet also having at least one closed loop, weakened parting line surrounding and spaced outwardly from each of said at least one opening through said protective sheet;
at least one attachment means for securing said outer member to said support structure including a shank extending through said corresponding openings in said protective sheet and said outer member and a head overlying said protective sheet outwardly of said parting line;
whereby, upon removal of said protective sheet from said outer member, said protective sheet will separate along said parting line and leave said outer surface of said outer member at least substantially free of protective sheet residue extending from under said attachment means.

5. The assembly as set forth in claim 4 wherein:
each of said at least one attachment means is a screw having a threaded shaft and a head of larger diameter than said shaft; said head including an inner portion engaging said protective sheet and having a diameter substantially the same as the portion of protective sheet within said parting line; said head also including a larger diameter outer portion extending radially beyond said inner portion and spaced from said protective sheet.

* * * * *